United States Patent [19]

Zann et al.

[11] 4,402,855

[45] Sep. 6, 1983

[54] TYPE A SMECTIC LIQUID CRYSTAL HAVING A POSITIVE DIELECTRIC ANISOTROPY

[75] Inventors: Annie Zann; Jean-Claude Dubois, both of Paris, France

[73] Assignee: Thomson-CSF, Paris, France

[21] Appl. No.: 283,740

[22] Filed: Jul. 15, 1981

[30] Foreign Application Priority Data

Jul. 18, 1980 [FR] France .................. 80 15904

[51] Int. Cl.³ .................. C09K 3/34; G02F 1/13; C07C 121/60; C07C 69/62
[52] U.S. Cl. .................. 252/299.65; 252/299.01; 252/299.5; 260/465 D; 560/62; 560/65; 560/73; 560/107; 560/108; 350/350 R; 350/350 S
[58] Field of Search .................. 252/299.65, 299.01, 252/299.5; 260/465 D; 560/62, 73, 107, 65, 108

[56] References Cited

U.S. PATENT DOCUMENTS

| | | | |
|---|---|---|---|
| 3,947,375 | 3/1976 | Gray et al. | 252/299.65 |
| 3,951,846 | 4/1976 | Gavrilovic | 252/299.65 |
| 4,029,594 | 6/1977 | Gavrilovic et al. | 252/299.65 |
| 4,073,742 | 2/1978 | Erdmann et al. | 252/299.65 |
| 4,228,087 | 10/1980 | Dubois et al. | 252/299.65 |
| 4,235,736 | 11/1980 | Beguin et al. | 252/299.65 |
| 4,256,656 | 3/1981 | Beguin et al. | 252/299.67 |

FOREIGN PATENT DOCUMENTS 19665 12/1980 European Pat. Off. ....... 252/299.63

OTHER PUBLICATIONS

Karamysheva, L. A., et al., J. Phys., Coll C3, Suppl. No. 4, vol. 40, pp. C3-37-40 (Apr. 1979).
Dubois, J. C., et al., Mol. Cryst. Liq. Cryst, vol. 42, pp. 139-152 (1977).

*Primary Examiner*—Teddy S. Gron
*Attorney, Agent, or Firm*—Oblon, Fisher, Spivak, McClelland & Maier

[57] ABSTRACT

A family of liquid crystals having a type A smectic mesophase with a positive dielectric anisotropy, which are particularly useful in the case of the thermo-optical effect.

The substances of the family are in accordance with the general formula:

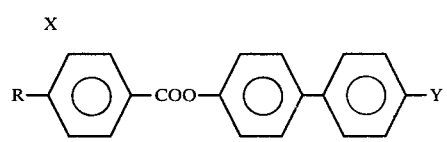

in which R represents an organic group of the alkyl or alkoxy type containing 1 to 15 carbon atoms and in which X and Y designate either the bromine or the nitrile radical.

10 Claims, No Drawings

TYPE A SMECTIC LIQUID CRYSTAL HAVING A POSITIVE DIELECTRIC ANISOTROPY

The present invention relates to a liquid crystal, whose general formula corresponds to a family of substances only differing from one another by an alkyl or alkoxy group and by a bromo or cyano radical. In certain temperature ranges, these substances have a type A smectic mesophase with a positive dielectric anisotropy. Mixtures of these substances with one another and with other liquid crystals are included within the scope of the invention. They can be used in visual displays where the advantage of the thermo-optical effect is utilized, with or without assistance of an electrical field.

The liquid crystal according to the invention is in accordance with the general formula:

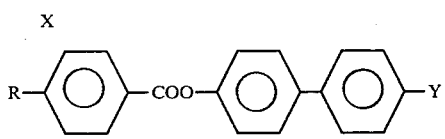

in which R represents an organic group of the alkyl or alkoxy type having 1 to 15 carbon atoms and in which X and Y designate either a bromo or cyano radical.

These substances are designated by:
(1) p-bromodiphenyl-4-(alkyl or alkoxy)-3-bromobenzoate, if X=Y=Br
(2) p-cyanodiphenyl-4-(alkyl or alkoxy)-3-bromobenzoate, if X=Br and Y=CN
(3) p-cyanodiphenyl-4-(alkyl or alkoxy)-3-cyanobenzoate, if X=Y=CN.

Hereinafter, the mechanism of the general production process of the invention is given, followed by a number of examples of operating procedures.

GENERAL PRODUCTION PROCESS

Firstly, 4-hydroxy-4'-bromodiphenyl and, as applicable, 4-alkoxy-3-bromobenzoic acid or 4-alkyl-3-bromobenzoic acid are synthesized to obtain brominated benzoates. The bromine in the brominated compounds is replaced by nitrile to obtain CN-containing compounds.

1. Synthesis of 4-hydroxy-4'-bromodiphenyl

The starting substance is diphenyl acetate with which bromine is reacted at 30° C. in the presence of iodine as the catalyst. The reaction diagram is as follows:

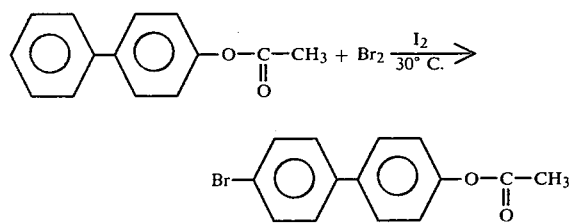

The product obtained is saponified by potassium hydroxide in an ethanolic medium and then hydrolyzed by hydrochloric acid in accordance with the following diagram:

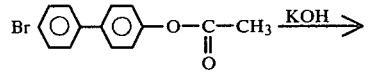

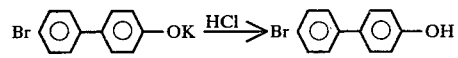

In the case of products X=Br and Y=CN it is necessary to synthesize 4-hydroxy-4'-cyanodiphenyl. It is obtained from the aforementioned product by reacting cuprous cyanide in dimethyl formamide:(DMF)

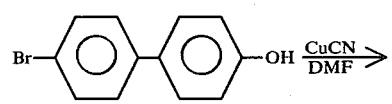

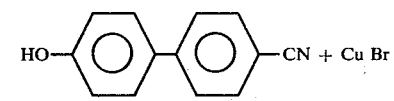

2. Synthesis of 4-(alkyl or alkoxy)-3-bromobenzoic acid

By bromination, the corresponding 4-substituted benzoic acid is obtained:

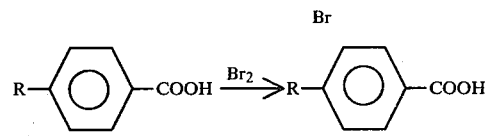

For $R=C_nH_{2n+1}$, reaction takes place in an aqueous solution of nitric and acetic acid in the presence of silver nitrate at 25° C.

For $R=C_nH_{2n+1}O$, the reaction takes place in an aqueous medium at 55° C.

3. Synthesis of the chloride of the aforementioned acid

The diagram is as follows:

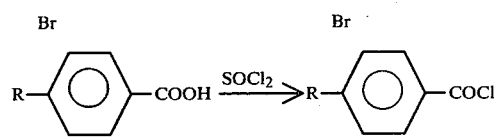

4. Synthesis of diphenylbenzoates

Three cases are to be envisaged:
(1) Case in which X=Y=Br:
4-hydroxy-4'-bromodiphenyl is esterified with the selected 3-bromo acid chloride at ambient temperature in a medium constituted by pyridine:

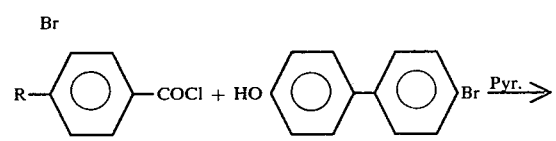

-continued

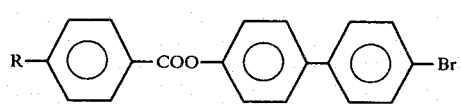

(2) Case where X=Br and Y=CN:
Esterification takes place between the acid chloride and the 4-hydroxy-4'-cyanodiphenyl in the same medium (pyridine):

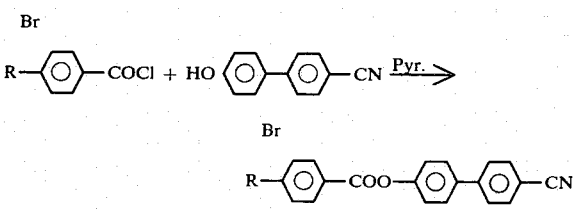

(3) Case where X=Y=CN:
The two Br groups are substituted by CN on products of type (1) in a medium containing cuprous cyanide and dimethyl formamide:

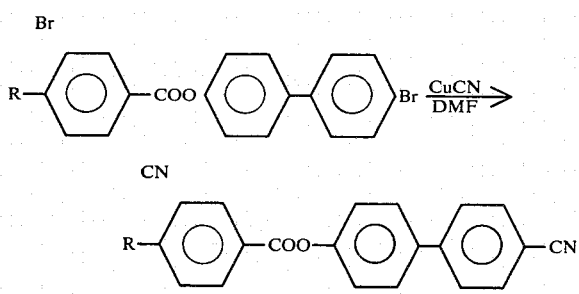

EXAMPLES OF OPERATING PROCEDURES
($R=C_7H_{15}$, X=Br, Y=CN)

(a) Synthesis of 4-n-heptyl-3-bromobenzoic acid 8.8 g (0.04 mole) of 4-n-heptyl-3-bromobenzoic acid and 8 g (0.05 mole) of bromine are introduced, accompanied by stirring, into a mixture of 20 ml of soft water, 27 ml of nitric acid and 120 ml of glacial acetic acid heated to 25° C. A solution of 6.8 g (0.04 mole) of silver nitrate in 20 ml of soft water are then added over a period of 30 minutes, whilst maintaining the temperature at 25° C. Stirring is continued for 3½ hours. The solution is then poured into 200 ml of ice water and stirred for 30 minutes. The product in suspension is filtered and washed with soft water up to neutrality. The acid is then separated from the silver bromide formed by dissolving in ethanol. The ethanolic solution is evaporated. 10.5 g of crude product is obtained, which is recrystallized in 30 cc of hexane. 9.1 g of synthesized acid is recovered. The melting point observed in 80° C.

(b) Synthesis of 4-hydroxy-4'-cyanodiphenyl 1 mole or 249 g of 4-hydroxy-4'-bromodiphenyl 1.25 mole or 113 g of cuprous cyanide and 1 liter of dimethyl formamide are introduced into a reactor. Refluxing, accompanied by stirring, takes place for 6 hours. The reaction mass is then poured into a reactor containing ethylene diamine and water. Extraction takes place with chloroform (2×1 liter), then the organic phase is washed to neutrality. After drying and evaporating the chloroform, 100 g of crude product are obtained. 47 g of product are obtained after chromatography on silica with benzene as the eluent. The synthesis yield is approximately 24%.

(c) Synthesis of 4'-cyanodiphenyl-4-n-heptyl-3-bromobenzoate 0.5 g ($2.5.10^{-3}$ mole) of 4-hydroxy-4'-cyanodiphenyl are dissolved in 5 ml of pyridine and 0.8 g ($2.5.10^{-3}$ mole) of 4-heptyl-3-bromobenzoyl chloride is added thereto. The mixture is stirred for 3 days at ambient temperature and then poured into a mixture of 20 g of ice and 2 cc of concentrated sulphuric acid. After stirring for 4 hours, the product is extracted with benzene, washed in soft water to neutrality and dried. It is then purified by silica column chromatography by eluting with a hexane: benzene (50:50) mixture. The product obtained is dissolved in ethanol and treated with vegetable black, followed by recrystallization in 15 cc of ethanol. 300 mg of pure product are collected, giving a yield of 25%. The product has the following characteristics: K 89.5 $S_A$ 129 N 151 I (temperatures in °C.) with the following conventions:
K crystalline phase
$S_A$ smectic phase A
N nematic phase
I isotropic liquid.

Table I summarises the formulas and temperature ranges of a number of examples of substances according to the invention.

TABLE I

| Example | Formula | Temperature ranges and heat of fusion. |
| --- | --- | --- |
| 1 | $C_7H_{15}$—⟨○⟩—COO—⟨○⟩—⟨○⟩—Br (with Br on first ring) | K90.5$S_A$ 152.5 I and 4.8 Kcal/mole |
| 2 | $C_8H_{17}O$—⟨○⟩—COO—⟨○⟩—⟨○⟩—Br (with Br on first ring) | K121 $S_A$ 172 N 176 I |

TABLE I-continued

| Example | Formula | Temperature ranges and heat of fusion. |
|---|---|---|
| 3 | Br–C₇H₁₅–⌬–COO–⌬–⌬–CN | K89.5 S_A 129 N151 I and 6.5 Kcal/mole |
| 4 | CN, C₇H₁₅–⌬–COO–⌬–⌬–CN | K131 [S_A] 94 [N] 117 I and 9.0 Kcal/mole |
| 5 | CN, C₈H₁₇O–⌬–COO–⌬–⌬–CN | K125 [N] 152 I |

The transition points between the phases are in degrees Celsius. The phases in square brackets are of the metastable type.

The dielectric properties of the substances of examples 1 and 3 were determined on the basis of measurements carried out on the mixture of each of the products with a nematic liquid crystal "F", p-pentyl phenol p-methoxybenzoate. "F" is a nematic of 29° to 43° C. The composition of the mixture is 90% of "F" and 10% of the compound according to the invention in molar fractions. The mixture is itself nematic. The measurements are performed at 22° C., the magnetic orientation field is $10^4$ oersteds and the frequency of the electrical measuring field is 10 kHz. The substances of examples 1 and 3 are designated by letters A and C, giving the following results table:

TABLE II

| Case of: | $\epsilon_\parallel$ | $\epsilon_\perp$ | $\epsilon_a$ |
|---|---|---|---|
| Pure F | 5.7 | 5.6 | +0.1 |
| Mixture of A + F | 5.1 | 4.8 | +0.3 |
| Mixture of C + F | 6.8 | 5.1 | +1.7 |

The pure products A and C therefore have a positive dielectric anisotropy. On the basis of a linear variation law, $\epsilon_a$ as a function of the concentration the following values are obtained: $\epsilon_a$ (A)=2, $\epsilon_a$ (C)=16. Thus, A is slightly positive and C highly positive.

Eutectic mixtures of compounds according to the invention with other type A smectic liquid crystals can be used in particular with p-cyanodiphenyls having the smectic phase A.

The following table gives examples of mixtures:

TABLE III

| Formulas of the ingredients and temperature range | Molar fraction of each ingredient. |
|---|---|
| C₈H₁₇–⌬–⌬–CN and Br | 0.82 |
|  | 0.18 |
| C₇H₁₅–⌬–COO–⌬–⌬–Br Range: K 15.5 S_A 53 N 57.5 I |  |

TABLE III-continued

| Formulas of the ingredients and temperature range | Molar fraction of each ingredient. |
|---|---|
| C₈H₁₇–⌬–⌬–CN and Br | 0.89 |
|  | 0.11 |
| C₇H₁₅–⌬–COO–⌬–⌬–CN Range: K 18 S_A 44 N 53 I |  |
| C₈H₁₇–⌬–⌬–CN | 0.64 |
| C₁₀H₂₁–⌬–⌬–CN and Br | 0.22 |
|  | 0.15 |
| C₇H₁₅–⌬–COO–⌬–⌬–Br Range: K 9.0 S_A 54 N 57 I |  |
| C₈H₁₇–⌬–⌬–CN | 0.54 |
| C₁₀H₂₁–⌬–⌬–CN | 0.18 |
| Br | 0.13 |
| C₇H₁₅–⌬–COO–⌬–⌬–Br and | 0.15 |
| C₈H₁₇O–⌬–⌬–CN Range: K 5 S_A 57 N 63 I |  |
| C₈H₁₇–⌬–⌬–CN | 0.58 |
| C₁₀H₂₁–⌬–⌬–CN | 0.19 |

TABLE III-continued

| Formulas of the ingredients and temperature range | Molar fraction of each ingredient. |
|---|---|
| Br<br>C₇H₁₅—⟨O⟩—COO—⟨O⟩—⟨O⟩—Br<br>and | 0.14 |
| F  F<br>C₉H₁₉O—⟨O⟩—COO—⟨O⟩—⟨O⟩—CN<br>F  F | 0.09 |
| Range: K 7 S$_A$ 63 N 69 I | |

These mixtures can be directly used in thermo-optical devices such as matrix screens or laser addressing screens. They all have the requisite characteristics of a wide smectic A range including the ambient, a narrow nematic range, a positive dielectric anisotropy, a good diffusing power and therefore a good constant and a low operating power.

What is claimed is:

1. A liquid crystal, having type A smectic phase, of the formula

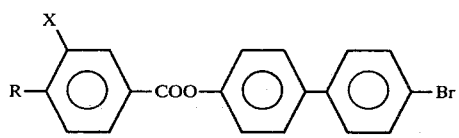

wherein R represents $C_nH_{2n+1}$ or $C_nH_{2n+1}O$ with $1 \leq n \leq 15$; and X represents Br or CN.

2. The liquid crystal according to claim 1, wherein:
R is $C_7H_{15}$ and
X is Br.

3. The liquid crystal according to claim 1, wherein:
R is $C_8H_{17}O$ and
X is Br.

4. The liquid crystal according to claim 1, wherein:
R is $C_7H_{15}$ and
X is CN.

5. The liquid crystal according to claim 1, wherein:
R is $C_8H_{17}O$ and
X is CN.

6. A liquid crystal composition, having type A smectic phase, comprising a first liquid crystal according to claim 1 and at least one additional type A smectic liquid crystal.

7. The liquid crystal composition according to claim 6, wherein said first liquid crystal is

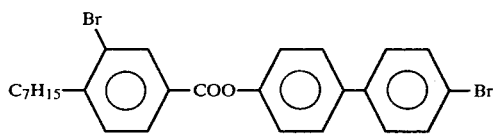

and said additional liquid crystal is

and wherein the molar proportions of said first liquid crystal and said additional liquid crystal are 0.18 and 0.82, respectively.

8. The liquid crystal composition according to claim 6, wherein said first liquid crystal is

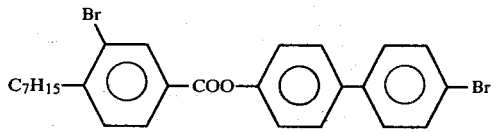

and said additional liquid crystal is a second liquid crystal of the formula

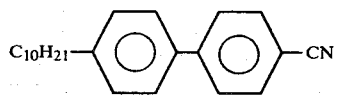

and a third liquid crystal of the formula

and wherein the molar proportions of said first, second and third liquid crystals are 0.15, 0.22 and 0.64, respectively.

9. The liquid crystal composition according to claim 6, wherein said first liquid crystal is

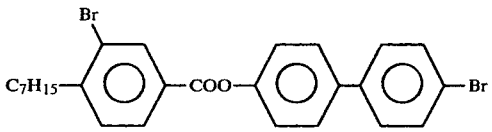

and said additional liquid crystal is a second liquid crystal of the formula

a third liquid crystal of the formula

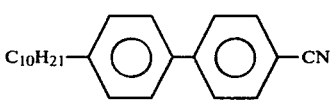

and a fourth liquid crystal of the formula

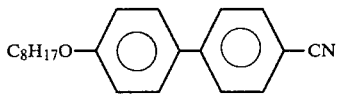

and wherein the molar proportions of said first, second, third and fourth liquid crystals are 0.13, 0.54, 0.18 and 0.15, respectively.

10. The liquid crystal composition according to claim 6, wherein said first liquid crystal is

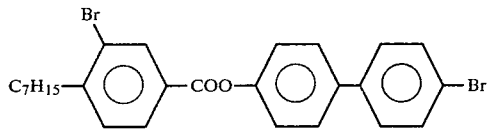

and said additional liquid crystal is a second liquid crystal of the formula

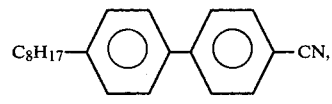

a third liquid crystal of the formula

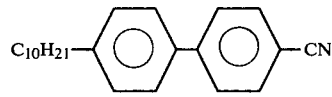

and a fourth liquid crystal of the formula and wherein the molar proportions of said first, second, third and fourth liquid crystals are 0.14, 0.58, 0.19 and 0.09, respectively.

* * * * *